United States Patent
Kintner-Meyer

(10) Patent No.: US 10,442,302 B2
(45) Date of Patent: Oct. 15, 2019

(54) BATTERY CHARGING CONTROL METHODS, ELECTRICAL VEHICLE CHARGING METHODS, BATTERY CHARGING CONTROL APPARATUS, AND ELECTRICAL VEHICLES

(71) Applicant: Battelle Memorial Institute, Richland, WA (US)

(72) Inventor: Michael Kintner-Meyer, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 772 days.

(21) Appl. No.: 15/163,925

(22) Filed: May 25, 2016

(65) Prior Publication Data
US 2016/0264008 A1    Sep. 15, 2016

Related U.S. Application Data

(63) Continuation of application No. 12/466,312, filed on May 14, 2009, now abandoned.

(51) Int. Cl.
*G06Q 30/00*    (2012.01)
*G06Q 10/00*    (2012.01)
(Continued)

(52) U.S. Cl.
CPC ........ *B60L 11/184* (2013.01); *B60H 1/00878* (2013.01); *B60L 1/08* (2013.01);
(Continued)

(58) Field of Classification Search
CPC .... G06Q 50/30; G06Q 10/06; G06Q 30/0261; G06Q 10/109; G06Q 30/0605;
(Continued)

(56) References Cited

U.S. PATENT DOCUMENTS 5,462,439 A   10/1995   Keith
5,467,006 A   11/1995   Sims
(Continued)

FOREIGN PATENT DOCUMENTS

CN   1510812   7/2004
CN   1574538   2/2005
(Continued)

OTHER PUBLICATIONS

Rugh, John P., et al. Reduction in vehicle temperatures and fuel use from cabin ventilation, solar-reflective paint, and a new solar-reflective glazing. No. 2007-01-1194. SAE Technical Paper, http://citeseerx.ist.psu.edu/viewdoc/download?doi=10.1.1.414.1412&rep=rep1&type=pdf2007 (Year: 2007).*

(Continued)

*Primary Examiner* — George Chen

(74) *Attorney, Agent, or Firm* — Wells St. John P.S.

(57) ABSTRACT

Battery charging control methods, electrical vehicle charging methods, battery charging control apparatus, and electrical vehicles are described. In one arrangement, battery charging control methods include accessing price information for electrical energy supplied by an electrical power distribution system and controlling an adjustment of an amount of the electrical energy from the electrical power distribution system used to charge a rechargeable battery at different moments in time using the price information. Other arrangements are described.

7 Claims, 8 Drawing Sheets

(51) Int. Cl.
| | |
|---|---|
| *B60L 11/18* | (2006.01) |
| *B60L 1/08* | (2006.01) |
| *B60H 1/00* | (2006.01) |
| *H02J 7/00* | (2006.01) |
| *B60L 53/14* | (2019.01) |
| *B60L 53/60* | (2019.01) |
| *B60L 53/64* | (2019.01) |
| *B60L 53/65* | (2019.01) |
| *B60L 58/12* | (2019.01) |
| *B60L 58/24* | (2019.01) |
| *B60L 53/30* | (2019.01) |

(52) U.S. Cl.
CPC ............ *B60L 53/14* (2019.02); *B60L 53/305* (2019.02); *B60L 53/60* (2019.02); *B60L 53/64* (2019.02); *B60L 53/65* (2019.02); *B60L 58/12* (2019.02); *B60L 58/24* (2019.02); *H02J 7/007* (2013.01); *B60L 2240/80* (2013.01); *B60W 2510/244* (2013.01); *B60W 2510/246* (2013.01); *Y02T 10/6269* (2013.01); *Y02T 10/7005* (2013.01); *Y02T 10/705* (2013.01); *Y02T 10/7044* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC .. G06Q 10/00; G06Q 10/06311; Y04S 10/54; Y04S 10/126; Y04S 30/12; Y04S 50/10; H04L 63/10; B60L 58/12; B60L 15/2045; B60L 1/02; B60L 2250/14; B60L 2260/44; B60L 2260/54; B60L 2270/46; B60L 55/00
See application file for complete search history.

(56) References Cited

U.S. PATENT DOCUMENTS

| | | | |
|---|---|---|---|
| 5,565,755 A | 10/1996 | Keith | |
| 5,569,993 A | 10/1996 | Keith | |
| 5,572,109 A | 11/1996 | Keith | |
| 5,598,084 A | 1/1997 | Keith | |
| 5,696,367 A | 12/1997 | Keith | |
| 6,158,225 A * | 12/2000 | Muto | B60H 1/00478 62/235.1 |
| 6,949,914 B2 | 9/2005 | Aradachi et al. | |
| 7,346,467 B2 | 3/2008 | Bohrer et al. | |
| 7,844,370 B2 | 1/2010 | Pollack et al. | |
| 7,665,559 B2 | 2/2010 | Torre-Bueno | |
| 7,719,232 B2 | 5/2010 | Kelty et al. | |
| 7,747,739 B2 | 6/2010 | Bridges et al. | |
| 7,782,021 B2 | 8/2010 | Kelty et al. | |
| 7,786,704 B2 | 8/2010 | Kelty et al. | |
| 7,849,944 B2 | 12/2010 | DeVault | |
| 7,949,435 B2 | 5/2011 | Pollack et al. | |
| 8,063,605 B2 | 11/2011 | Tonegawa et al. | |
| 8,116,915 B2 | 2/2012 | Kempton | |
| 8,810,192 B2 | 8/2014 | Bridges et al. | |
| 8,898,278 B2 | 11/2014 | Bridges et al. | |
| 9,436,948 B2 | 9/2016 | Bridges et al. | |
| 9,674,771 B2 | 6/2017 | Bridges et al. | |
| 2004/0075417 A1 | 4/2004 | Aradachi et al. | |
| 2006/0036350 A1 | 2/2006 | Bohrer et al. | |
| 2006/0278449 A1 | 12/2006 | Torre-Bueno | |
| 2008/0039979 A1 | 2/2008 | Bridges et al. | |
| 2008/0039980 A1 | 2/2008 | Pollack et al. | |
| 2008/0039989 A1 | 2/2008 | Pollack et al. | |
| 2008/0040223 A1 | 2/2008 | Bridges et al. | |
| 2008/0040263 A1 | 2/2008 | Bridges et al. | |
| 2008/0040295 A1 | 2/2008 | Kaplan et al. | |
| 2008/0040296 A1 | 2/2008 | Bridges et al. | |
| 2008/0040479 A1 | 2/2008 | Bridges et al. | |
| 2008/0052145 A1 | 2/2008 | Kaplan et al. | |
| 2008/0150491 A1 | 6/2008 | Bergveld et al. | |
| 2008/0179040 A1 | 7/2008 | Rosenbaum | |
| 2008/0236181 A1 | 10/2008 | Zhu et al. | |
| 2009/0021218 A1 | 1/2009 | Kelty et al. | |
| 2009/0040029 A1 | 2/2009 | Bridges et al. | |
| 2009/0043519 A1 | 2/2009 | Bridges et al. | |
| 2009/0043520 A1 | 2/2009 | Pollack et al. | |
| 2009/0063367 A1 | 3/2009 | Brown et al. | |
| 2009/0063680 A1 | 3/2009 | Bridges et al. | |
| 2009/0066287 A1 | 3/2009 | Pollack et al. | |
| 2009/0114463 A1 * | 5/2009 | DeVault | B60K 6/365 180/65.29 |
| 2009/0200988 A1 | 8/2009 | Bridges et al. | |
| 2009/0212745 A1 | 8/2009 | Kelty et al. | |
| 2009/0216688 A1 | 8/2009 | Kelty et al. | |
| 2010/0017249 A1 | 1/2010 | Fincham et al. | |
| 2010/0292855 A1 | 11/2010 | Kintner-Meyer | |
| 2011/0004358 A1 | 1/2011 | Pollack et al. | |
| 2011/0025556 A1 | 2/2011 | Bridges et al. | |
| 2015/0077056 A1 | 3/2015 | Bridges et al. | |
| 2015/0208331 A1 | 7/2015 | Bridges et al. | |
| 2016/0347195 A1 | 12/2016 | Bridges et al. | |

FOREIGN PATENT DOCUMENTS

| | | |
|---|---|---|
| CN | 101326076 | 12/2008 |
| CN | 201080020969.5 | 7/2013 |
| CN | 201080020969.5 | 1/2015 |
| CN | 201510208468.4 | 7/2016 |
| DE | 10 2007 039480 | 2/2009 |
| EP | 10721584.0 | 11/2017 |
| GB | 2273614 | 6/1994 |
| IN | 4126/KOLNP/2011 | 5/2017 |
| JP | H02-280633 | 11/1990 |
| WO | WO 2009/012018 | 1/2009 |
| WO | WO 2009/052451 | 4/2009 |
| WO | PCT/US2010/034432 | 8/2011 |
| WO | PCT/US2010/034432 | 11/2011 |

OTHER PUBLICATIONS

"Aggregrating Resources & Managing Power Flow", Apr. 13, 2009, Available Online at www.v2greencom/technology/v2green-server-1, 1 page.
"Delivering Valuable Distributed Power Resources", Apr. 13, 2009, Available Online at www.v2green.com/solutions/delivering-valuable-distributed-power-resources, 1 page.
Brooks et al., "Integration of Electric Drive Vehicles with the Electric Power Grid—A New Value Stream", EVS 18, 2001, Berlin, 15 pages.
Brooks et al., "PG&E and Tesla Motors: Vehicle to Grid Demonstration and Evaluatino Program", 23rd International Electric Vehicle Symposium, 2007, United States, 10 pages.
Lazar et al., "Plug-In Hybrid Vehicles, Wind Power, and the Smart Grid", EUEC Energy and Environment Conference, Tucson, AZ, Jan. 2008, United States, 8 pages.
Linden, "Available Capacity" Definition, Handbook of Batteries, 2nd Edition, McGraw-Hill, Inc., 1995, United States, p. A.1.
Linden, "Capacity" Definition, Handbook of Batteries, 2nd Edition, McGraw-Hill, Inc., 1995, United States, p. A.2.
Linden, "Rated Capacity" Definition, Handbook of Batteries, 2nd Edition, McGraw-Hill, Inc., 1995, United States, p. A.8.
Linden, "State-of-Charge" Definition, Handbook of Batteries, 2nd Edition, McGraw-Hill, Inc., United States, p. A.10.
Parks et al., "Costs and Emissions Associated with Plug-In Hybrid Electric Vehicle Charging in Xcel Energy Colorado Service Territory", Technical Report, May 2007, United States, 29 pages.
Press et al., "Numerical Recipes: The Art of Scientific Computing", Cambridge University Press, 1988, United Kingdom, pp. 288-293.

* cited by examiner

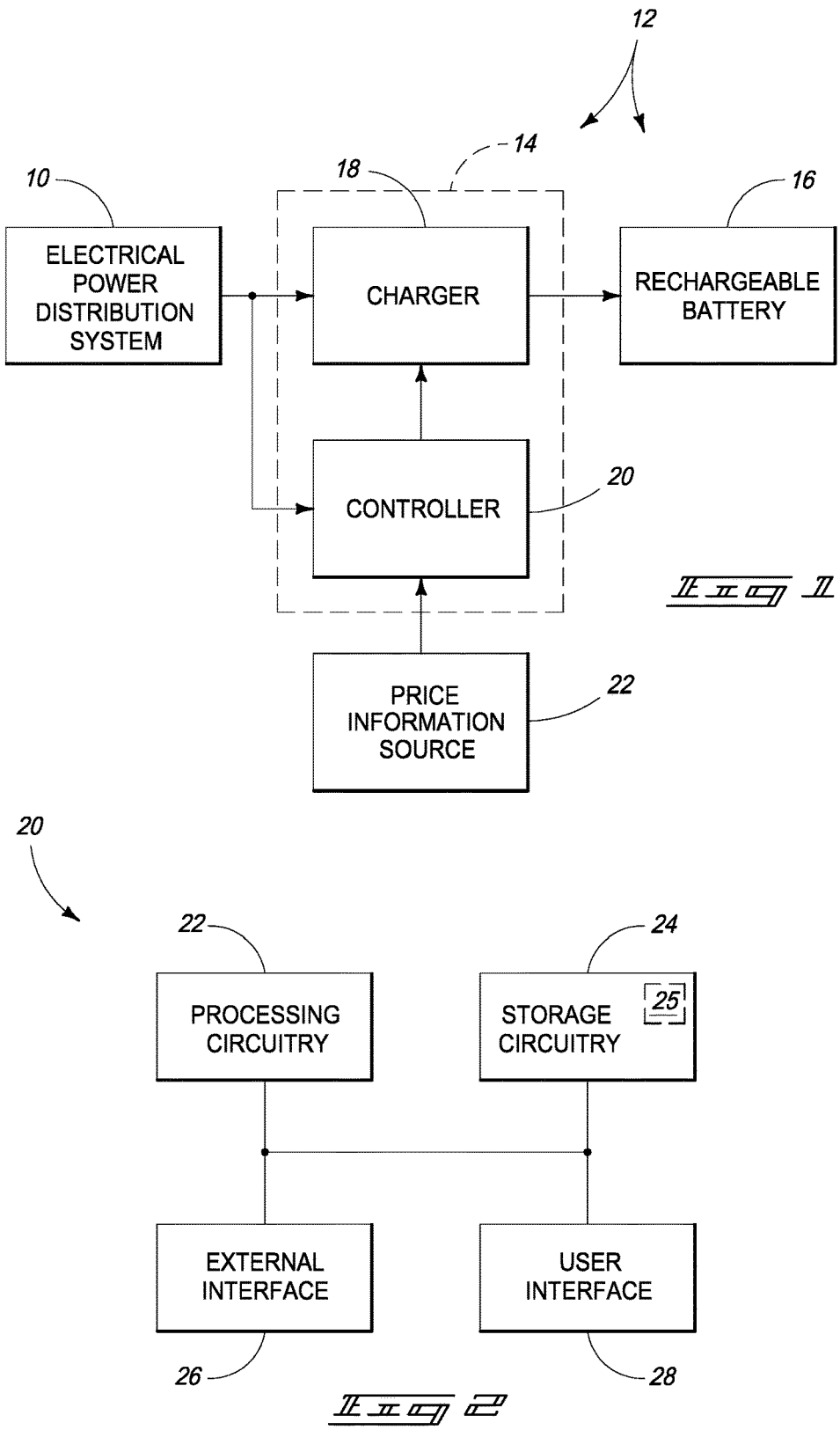

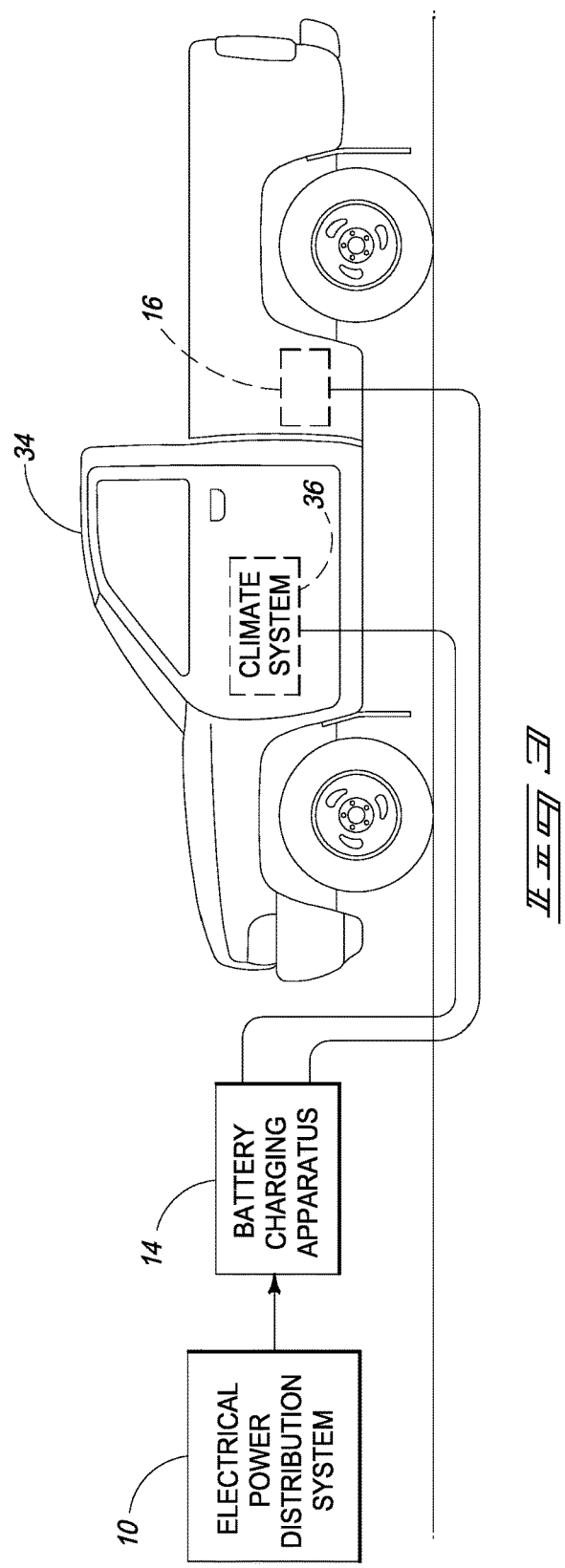

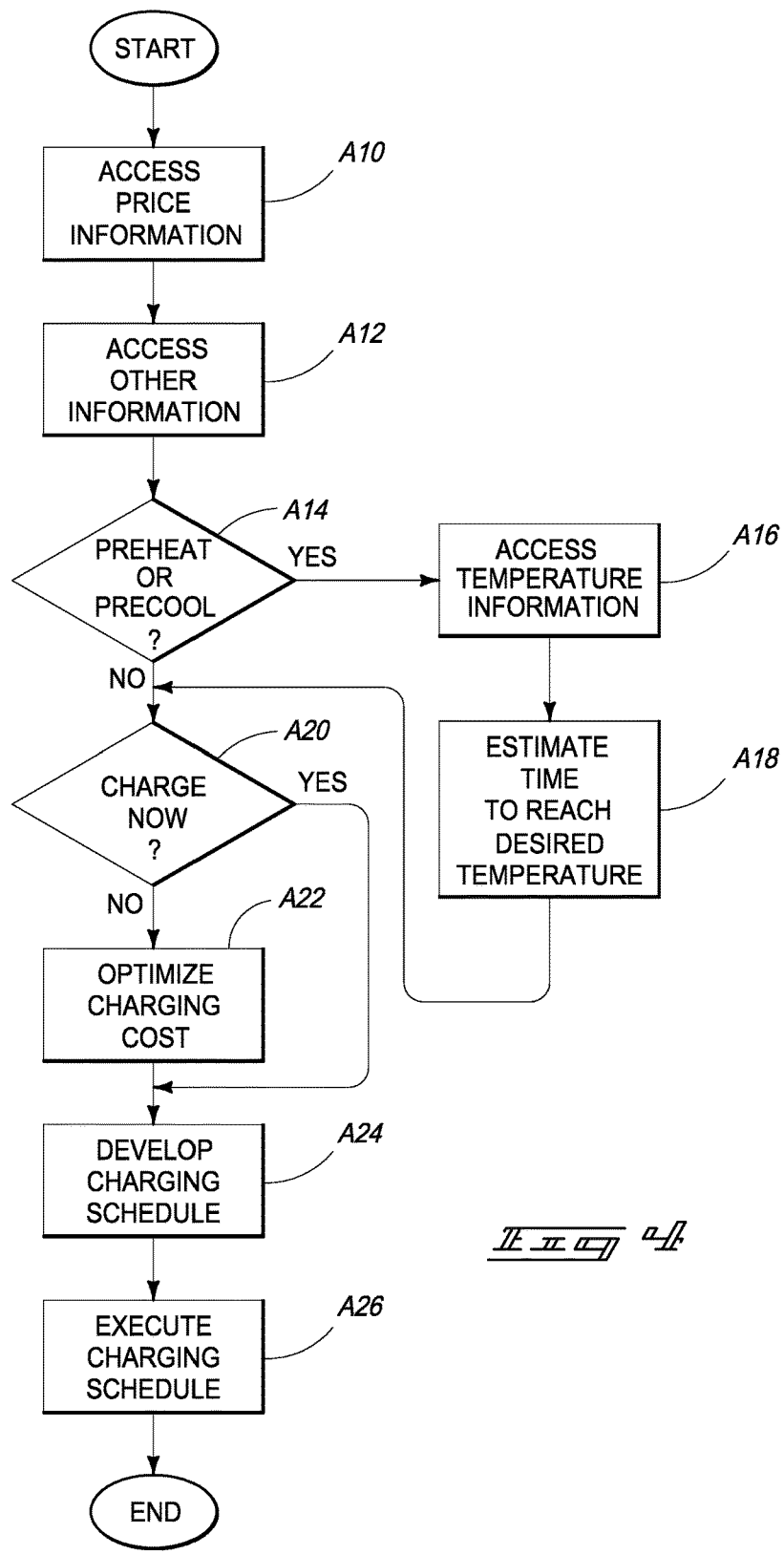

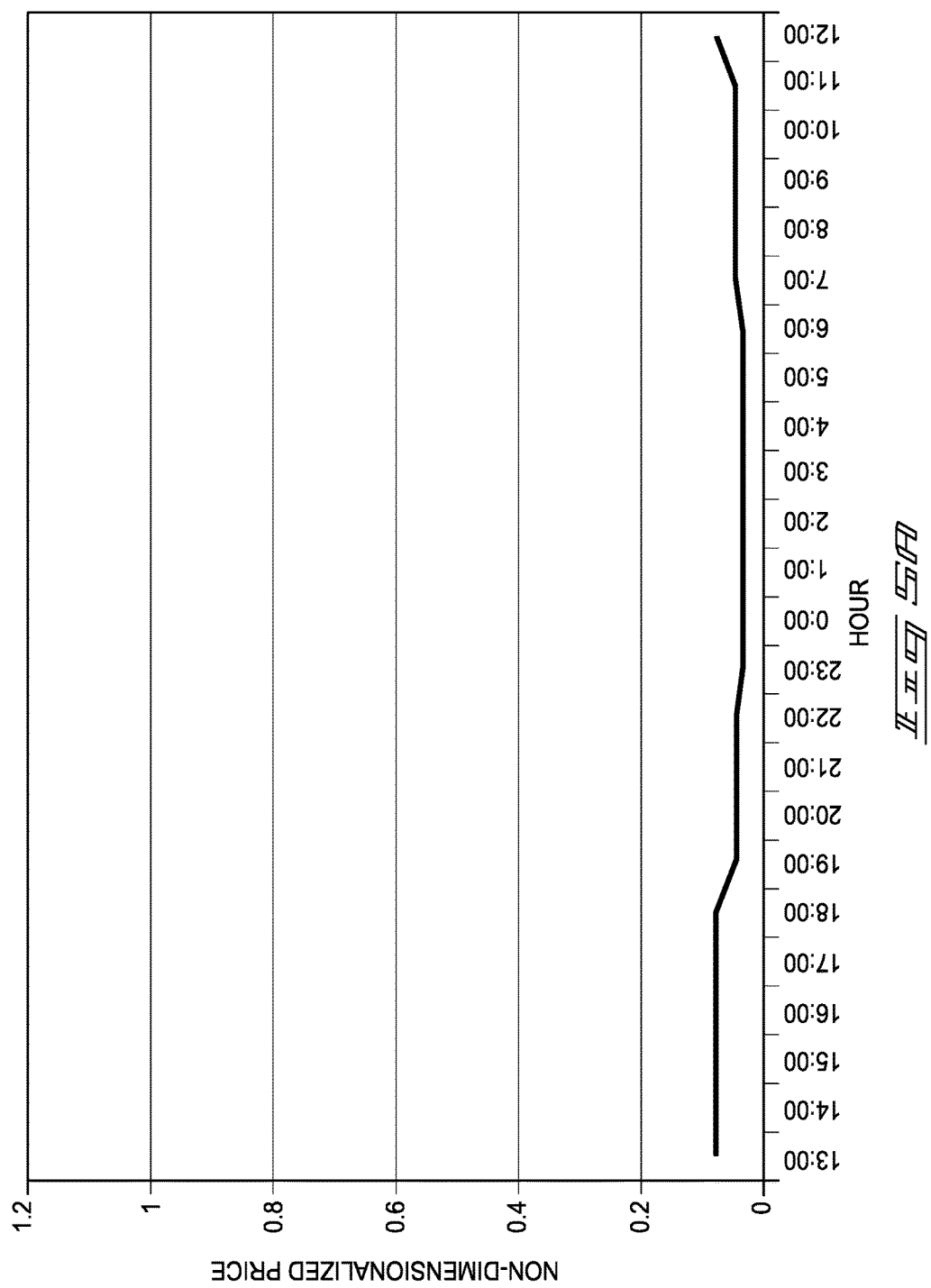

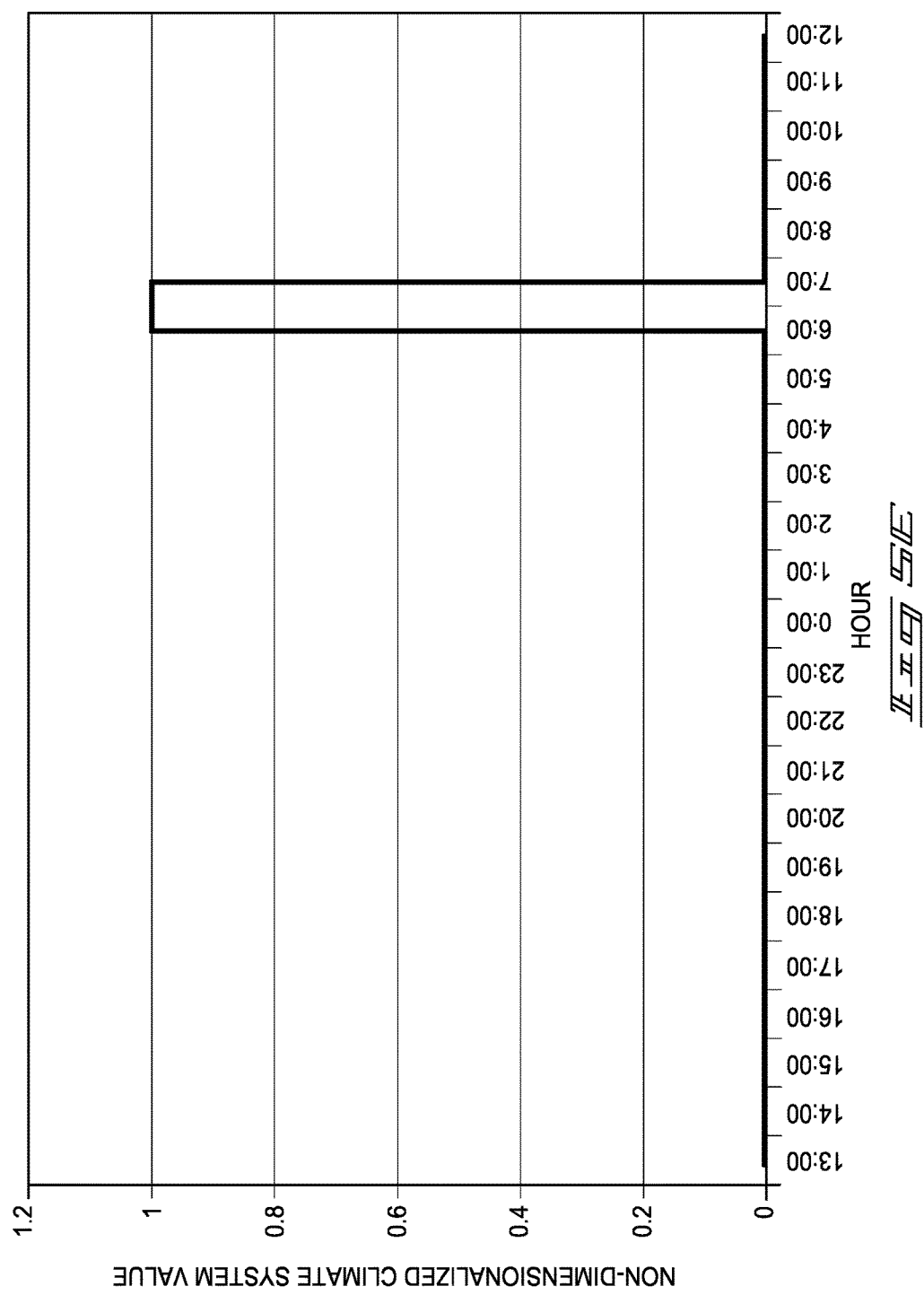

BATTERY CHARGING CONTROL METHODS, ELECTRICAL VEHICLE CHARGING METHODS, BATTERY CHARGING CONTROL APPARATUS, AND ELECTRICAL VEHICLES

RELATED PATENT DATA

This application is a continuation of and claims priority to U.S. patent application Ser. No. 12/466,312, which was filed May 14, 2009, titled "Battery Charging Control Methods, Electrical Vehicle Charging Methods, Battery Charging Control Apparatus, and Electrical Vehicles", the teachings of which are incorporated herein by reference.

GOVERNMENT RIGHTS STATEMENT

This invention was made with Government support under contract DE-AC0676RLO1830 awarded by the U.S. Department of Energy. The Government has certain rights in the invention.

TECHNICAL FIELD

The present invention, in various embodiments, relates to battery charging control methods, electrical vehicle charging methods, battery charging control apparatus, and electrical vehicles.

BACKGROUND

The use of hybrid electric vehicles is widespread. In these vehicles, batteries are recharged by the vehicle itself without relying on a plug-in connection to an electrical power distribution system. A new generation of vehicles is now being developed, however, that will rely on drawing electrical energy from the electrical power distribution system to charge rechargeable batteries. Such vehicles include plug-in hybrid electric vehicles and plug-in electric vehicles. These vehicles may begin charging upon being connected to the electrical power distribution system.

BRIEF DESCRIPTION OF THE DRAWINGS

Preferred embodiments of the disclosure are described below with reference to the following accompanying drawings.

FIG. 1 is a block diagram of a battery system and an electrical power distribution system according to one embodiment.

FIG. 2 is a block diagram of a controller according to one embodiment.

FIG. 3 is an illustrative representation of an electrical vehicle coupled with a battery charging apparatus and an electrical power distribution system according to one embodiment.

FIG. 4 is a flow chart of a battery charging method according to one embodiment.

FIG. 5A is a graph illustrating price information according to one embodiment.

FIG. 5D is a graph illustrating schedule information according to another embodiment.

FIG. 5E is a graph illustrating schedule information according to one embodiment.

DESCRIPTION

Figure 5B:
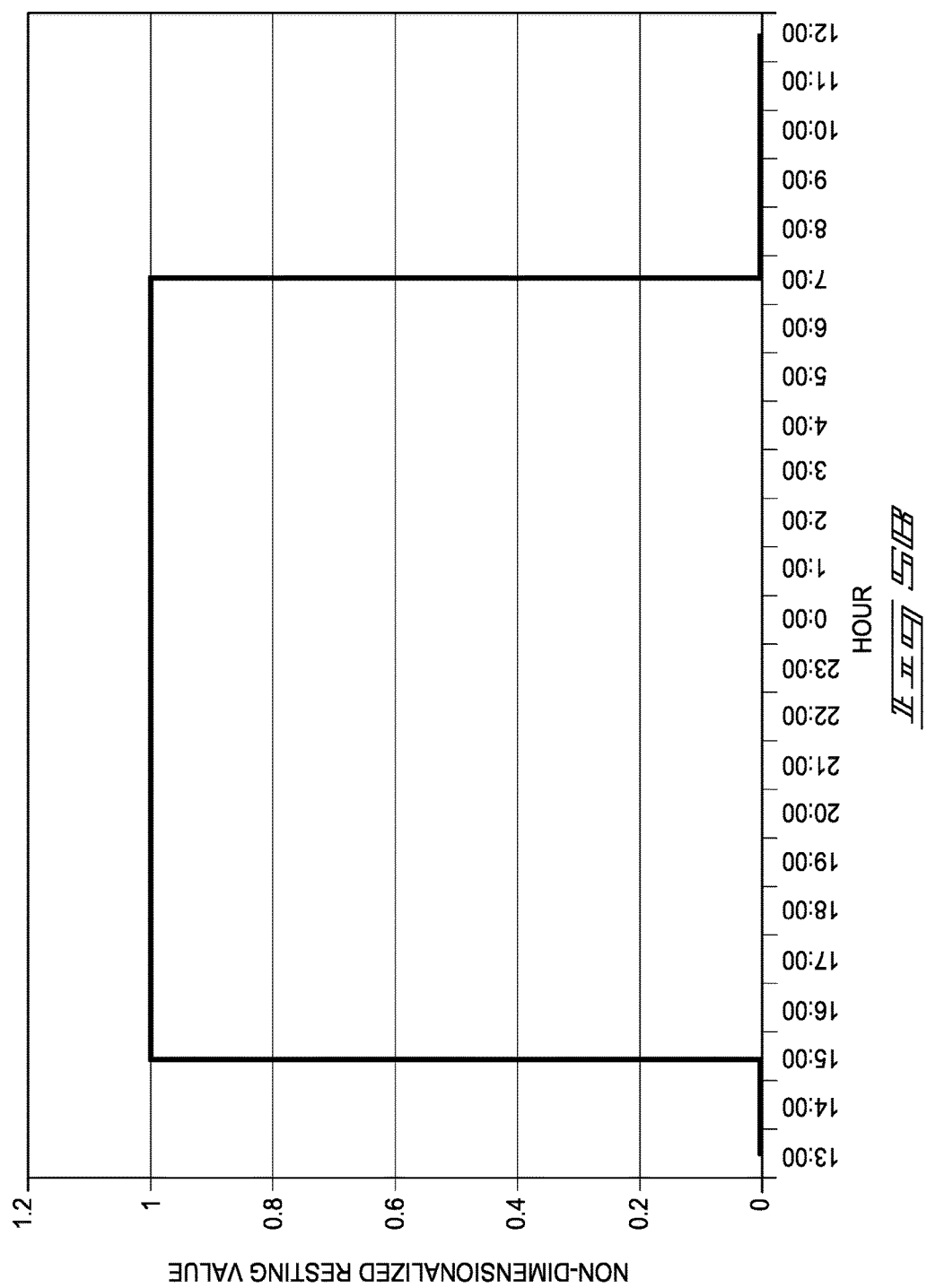
FIG. 5B is a graph illustrating resting time information according to one embodiment.

This disclosure is submitted in furtherance of the constitutional purposes of the U.S. Patent Laws "to promote the progress of science and useful arts" (Article 1, Section 8).

At least some aspects of the present disclosure are directed towards methods and apparatus for charging rechargeable batteries. In some embodiments described herein, price information is used during charging of the rechargeable batteries. In one specific embodiment described below, price information regarding prices of electrical energy supplied by an electrical power distribution system is used to control one or more charging operations of the rechargeable batteries. The disclosure describes, in some example embodiments herein, methods and apparatus for charging batteries of an electrical vehicle. In other embodiments, the rechargeable batteries may be used in applications other than vehicle applications. Other aspects and embodiments are described herein and are encompassed by the claims.

Referring to FIG. 1, one embodiment of a battery system 12 is shown coupled with an electrical power distribution system 10. Although only one battery system 12 is shown in the embodiment of FIG. 1, numerous additional battery systems 12 may be coupled with electrical power distribution system 10 in other embodiments. In one embodiment, electrical power distribution system 10 is arranged to provide electrical energy to the battery system 12 to charge one (or more if present) rechargeable batteries 16 of the battery system 12. In some embodiments described below, the rechargeable battery or batteries 16 may be utilized to power an electrical vehicle (e.g., plug-in hybrid electric vehicle (PHEV), electric vehicle (EV)). Rechargeable batteries 16 may be used in other apparatus and/or in different applications in other embodiments.

In one embodiment, electrical power distribution system 10 comprises any appropriate electrical energy delivery system configured to deliver residential, commercial, industrial, or other electrical energy from a supply to customers or consumers. Electrical power distribution system 10 is arranged to provide electrical energy for consumption by battery system 12, for example, for operation and for recharging the rechargeable batteries 16. Electrical power distribution system 10 may be arranged as one or more source (e.g., generator or other construction) configured to supply electrical energy. Generators may be individually taken on-line (e.g., on grid) or off-line (e.g., off grid), or the output thereof may be adjusted, according to the usage of the electrical energy. Electrical power distribution system 10 includes a distribution grid which may comprise a plurality of switching stations, transformers, and transmission lines arranged to transmit electrical energy from sources to loads, such as the battery systems 12. The transmission lines may transmit the electrical energy using high voltage lines spanning across vast distances (e.g., hundreds or thousands of miles) between distant geographic locations in some arrangements.

In addition to remotely located generators, electrical power distribution system 10 may include one or more generators located near battery system 12. For example, in one embodiment, electrical power distribution system 10 may include one or more generators located in the same neighborhood as battery system 12 and the one or more generators may be configured to provide power to some or all of the neighborhood. In another more specific example, electrical power distribution system 10 may include one or more generators located in or adjacent to a structure to which battery system 12 is connected. The one or more generators may be configured to provide power to the structure. In some cases, the one or more generators may be configured to provide power to the structure in the event that another power generator of electrical power distribution system 10 is disabled or in the event that transmission lines that typically provide power to the structure are disabled. In some cases, the one or more generators may be located in or adjacent to residential, commercial, industrial, or other structures.

In one implementation, electrical power distribution system 10 is arranged to provide alternating current electrical energy at a system frequency of 60 Hz. System frequency is the frequency of system voltage. Electrical power distribution system 10 may provide electrical energy at exemplary voltages of 120/240 VAC, 120/208 VAC, 277/480 VAC or other appropriate voltages in example arrangements.

As mentioned above, battery system 12 includes one or more rechargeable batteries 16 in the described embodiment. Rechargeable battery 16 may have different configurations in different implementations (e.g., lead acid, nickel hydride, lithium ion in some examples). During use, the state of charge of rechargeable battery 16 decreases, and electrical energy from electrical power distribution system 10 is configured to supply electrical energy for recharging of the rechargeable battery 16 to an increased state of charge.

In addition, battery system 12 also includes a battery charging apparatus 14 in one embodiment. In the depicted embodiment, battery charging apparatus 14 is coupled between electrical power distribution system 10 and rechargeable battery 16. Battery charging apparatus 14 is configured to implement charging operations of rechargeable battery 16 using the electrical energy from the electrical power distribution system 10 in one embodiment.

In the depicted embodiment, battery charging apparatus 14 includes a charger 18 and a controller 20. Charger 18 is configured to receive electrical energy from electrical power distribution system 10 and to provide the electrical energy to rechargeable battery 16 to charge rechargeable battery 16. In doing so, charger 18 may, in one embodiment, alter a form of the electrical energy received from electrical power distribution system 10 and provide the altered electrical energy to rechargeable battery 16. For example, charger 18 may alter the voltage of the electrical energy and/or may alter the electrical energy to be Direct Current (DC) electrical energy rather than AC electrical energy.

As discussed herein according to one embodiment, charger 18 can apply different amounts of electrical energy to the rechargeable battery 16 at different moments in time. Furthermore, controller 20 may control when and at what rate charger 18 applies electrical energy to rechargeable battery 16 in one embodiment.

In one embodiment discussed in additional detail below, controller 20 is configured to access price information regarding prices of the electrical energy supplied by electrical power distribution system 10. The price information may describe prices of the electrical energy (e.g., in cents per kilowatt hour, in one embodiment). For example, the price information may describe future prices of the electrical energy over a future period of time. In some cases, an operator of electrical power distribution system 10 may alter the price for electrical energy supplied by electrical power distribution system 10 over time. For example, the price of the electrical energy may be higher during the day when there is greater aggregate consumption of electrical power than at night. In one embodiment, the operator may charge several different prices during the course of a twenty-four hour period. Accordingly, in one embodiment, the price information may describe hourly prices of the electrical energy over a future twenty-four hour period. The prices may vary from hour to hour. Controller 20 may additionally access updates to the price information as described in more detail below.

Controller 20 may access the price information via a price information source 22. Price information source 22 may be embodied in many different forms. In one embodiment, price information source 22 may be an article of manufacture which can contain, store, or maintain the price information. For example, price information source 22 may be a USB drive, floppy diskette, zip disk, hard drive, random access memory, read only memory, flash memory, cache memory, and/or other configuration capable of storing the price information. The electrical power distribution system 10 may program the article of manufacture with the price information and then couple the article of manufacture to controller 20.

In another embodiment, price information source 22 may include one or more of a server, computer, or other data device storing the price information that may be in communication with controller 20 via a communications network. For example, price information source 22 may be a server on the Internet and controller 20 may be connected to the Internet via wired and/or wireless communication. In other arrangements, the server may be located on a private network and controller 20 may communicate with the server via wired and/or wireless communication (e.g., via a Power Line Carrier (PLC) network). In another arrangement, a power meter of electrical power distribution system 10 may comprise price information source 22 and controller 20 may be in communication with the meter, for example via a PLC network.

In one embodiment, Controller 20 may use the price information to control charger 18, as is further discussed below. For example, using the price information, controller 20 may increase or decrease the amount of electrical energy which is provided by charger 18 to charge rechargeable battery 16 in one embodiment. In one more specific example, controller 20 may use the price information to determine at least one window of time during which controller 20 may allow charger 18 to charge rechargeable battery 16. The window of time may include one or more hour segments of a twenty-four hour period during which the price of the electrical energy supplied by electrical power distribution system 10 is lower compared with other windows of the twenty-four hour period. Optimizing the cost of charging rechargeable battery 16 in this manner may be economically advantageous to the person or entity paying for the electrical energy consumed in charging rechargeable battery 16.

For example, battery charging apparatus 14 may be connected to electrical power distribution system 10 at 3:00 PM and controller 20 may determine (e.g., using a present state of charge of rechargeable battery 16) that rechargeable battery 16 should be charged for six hours during a twenty-four hour period, the twenty-four hour period beginning at 3:00 PM. Controller 20 may determine, based on the price information, that charging rechargeable battery 16 from 9:00 PM to 3:00 AM will result in the lowest possible cost available during the twenty-four hour period. In some cases, there may be several windows of time during the twenty-four hour period that may also result in the lowest possible cost. For example, the cost of charging from 10:00 PM to 4:00 AM may be the same as the cost of charging from 9:00 PM to 3:00 AM. Of course, periods of different lengths and other resolutions of price information could alternatively be used. For example, if the price information describes prices of a future twelve-hour period with half-hour granularity, controller 20 may select a charging window based on half-hour segments of time (e.g., 8:30 PM to 2:30 AM). In another example, plural non-continuous windows occurring at different times of the day may be used.

Controller 20 may also be configured to access information regarding rechargeable battery 16 and to control an amount of the electrical energy used to charge rechargeable battery 16 and/or a time of charging by charger 18 using the accessed information. In addition, controller 20 may access other information for use in controlling the rate and/or time of charging. For example, in one embodiment, controller 20 may communicate with charger 18 to access information related to a current charge state of rechargeable battery 16, a temperature of rechargeable battery 16, and/or a capacity of rechargeable battery 16.

Controller 20 may also access user-inputted information (e.g., a desired point in time in the future for the battery 16 to be fully charged) to control the amount of electrical energy used to charge rechargeable battery 16 and/or a time of charge in illustrative examples. Additional information may also be used by controller 20 to control the charging.

Referring to FIG. 2, one embodiment of controller 20 is shown. The illustrated example controller 20 includes processing circuitry 22, storage circuitry 24, an external interface 26 and a user interface 28 in the depicted embodiment. Controller 20 may include more, less, and/or alternative components in other embodiments.

In one embodiment, processing circuitry 22 is arranged to process data, control data access and storage, issue commands, and control other desired operations. For example, processing circuitry 22 is configured to access price information regarding prices of electrical energy supplied by electrical power distribution system 10, information regarding a state of charge of rechargeable battery 16, and user-inputted information in one embodiment. Processing circuitry 22 may utilize the accessed information to control charging operations of charger 18 with respect to rechargeable battery 16 in one embodiment.

Processing circuitry 22 may comprise circuitry configured to implement desired programming provided by appropriate media in at least one embodiment. For example, processing circuitry 22 may be implemented as one or more of processor(s) and/or other structure configured to execute executable instructions including, for example, software and/or firmware instructions, and/or hardware circuitry. Exemplary embodiments of processing circuitry 22 include hardware logic, PGA, FPGA, ASIC, state machines, and/or other structures alone or in combination with a processor. These examples of processing circuitry 22 are for illustration and other configurations are possible.

Storage circuitry 24 is configured to store programming such as executable code or instructions (e.g., software and/or firmware), electronic data, databases, or other digital information and may include processor-usable media. For example, processing circuitry 22 may control storage circuitry 24 to store information accessed from system 10, rechargeable battery 16 and/or user-inputted information in one embodiment.

Processor-usable media may be embodied in any computer program product(s) or article of manufacture(s) 25 which can contain, store, or maintain programming, data and/or digital information for use by, or in connection with, an instruction execution system including processing circuitry in the exemplary embodiment. For example, exemplary processor-usable media may include any one of physical media such as electronic, magnetic, optical, electromagnetic, infrared, or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 24 described above and/or communicated via a network or other transmission media and configured to control appropriate processing circuitry. For example, programming may be provided via appropriate media including, for example, embodied within articles of manufacture. In another example, programming may be embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure. Exemplary programming including processor-usable code may be communicated as a data signal embodied in a carrier wave in but one example.

External interface 26 is arranged to implement external communications and/or data acquisition of controller 20. For example, external interface 26 may be coupled with price information source 22 and charger 18 in one embodiment. External interface 26 may be implemented as a network interface card (NIC), serial or parallel connection, USB port, FireWire interface, flash memory interface, floppy disk drive, or any other suitable arrangement.

User interface 28 is configured to interact with a user including conveying data to a user (e.g., displaying data for observation by the user, audibly communicating data to a user, etc.) as well as receiving inputs from the user (e.g., tactile input, voice instruction, etc.). Accordingly, in one exemplary embodiment, user interface 28 may include a display (e.g., cathode ray tube, LCD, etc.) configured to depict visual information and an audio system as well as a keyboard, mouse and/or other input device. Any other suitable apparatus for interacting with a user may also be utilized. In one arrangement, a user may input information to control the charging by charger 18. For example, the user may specify a point of time in the future in which the battery 16 is to be fully charged.

Referring to FIG. 3, one embodiment of charging operations of battery system 12 (illustrated in FIG. 1) is described with respect to a load in the form of an electrical vehicle 34 which includes one or more rechargeable batteries 16. Vehicle 34 may be at least partially powered by an electric motor (not illustrated). The electric motor may consume electrical energy stored by rechargeable battery 16 to, at least in part, provide motive power to propel vehicle 34.

The arrangement of battery system 12 in FIG. 3 is illustrative for explanation of some aspects of the disclosure and other arrangements are possible. For example, battery charging apparatus 14 of battery system 12 may be installed at home, work, or any other location where it is desirable to implement charging of rechargeable battery 16 and electrical energy from electrical power distribution system 10 is available for consumption. Although FIG. 3 depicts rechargeable batteries 16 in electrical vehicle 34, rechargeable batteries 16 charged by battery charging apparatus 14 may be utilized in different applications other than electrical vehicles 34.

Furthermore, one or more components of the battery system 12 may be implemented differently in other embodiments. For example, battery charging apparatus 14 may be located onboard vehicle 34 in some implementations. In other arrangements, charger 18 may be located onboard vehicle 34 and controller 20 may be located offboard vehicle 34. In addition, rechargeable batteries 16 may be removable from vehicle 34 (or the housing of other loads) and coupled with charger 18, which is not located on the vehicle in some embodiments.

Vehicle 34 may include a climate system 36. Climate system 36 may be configured to modify a temperature associated with vehicle 34. For example, climate system 36 may include an air conditioner for cooling a cabin of vehicle 34. Alternatively or additionally, climate system 36 may include a heater for heating the cabin. In one embodiment, climate system 36 may measure and/or monitor one or more temperatures associated with vehicle 34 and may provide information describing the measured and/or monitored temperatures to controller 20 and/or charger 18. A user of vehicle 34 may provide a desired temperature (e.g., a desired cabin temperature) to vehicle 34. In some configurations, climate system 36 may have access to information describing the desired temperature.

In one arrangement, climate system 36 may be configured to heat and/or cool rechargeable battery 16. Doing so may be helpful in extreme weather conditions. For example, if the temperature is very cold, climate system 36 may heat rechargeable battery 16 to improve the performance of rechargeable battery 16. Similarly, if the temperature is very hot, climate system 36 may cool rechargeable battery 16. Heating and/or cooling rechargeable battery 16 may make charging rechargeable battery 16 more efficient or may improve the usable life of rechargeable battery 16 in some embodiments.

As was described above, controller 20 may be onboard vehicle 34 in one embodiment. If controller 20 is onboard, vehicle 34 may be connected to electrical power distribution 10 via a simple electrical cable and might not require any circuitry between vehicle 34 and electrical power distribution 10 other than the cable. In this embodiment, controller 20 may communicate with charger 18 and/or climate system 36 using wired and/or wireless connections (e.g., via a Controller Area Network (CAN) bus onboard vehicle 34 that facilitates communication between devices of vehicle 34). For example, controller 20 may retrieve temperature information from climate system 36. Furthermore, controller 20 may communicate with other devices onboard vehicle 34 (e.g., a navigation system, vehicle computer, etc.).

In another embodiment, controller 20 may be offboard vehicle 34. If offboard, controller 20 may communicate with charger 18, climate system 36, and/or other devices of vehicle 34 using one or more wired and/or wireless connections (e.g., via a ZigBee wireless connection, Power Line Carrier (PLC) connection, a cable having a J1772 SAE standard five-pin plug plugged into vehicle 34, or any other suitable arrangement). In one embodiment, controller 20 may be built into a cable used to connect electrical vehicle 34 to electrical power distribution system 20. In this embodiment, controller 20 may appear to be a "bump" in the cable. Any suitable communication system and power delivery system may be used to transfer communications, data, and energy between system 10 and battery system 12.

As was described above, controller 20 may include user interface 28. A user may communicate information to controller 20 via user interface 28 such as a desired time of charge completion, a desired state of charge of the battery at time of charge completion (e.g., 50% charged, 80% charged, 100% charged, etc.), a desired temperature for vehicle 34, whether to pre-heat or pre-cool vehicle 34 to the desired temperature, etc. In one embodiment, user interface 28 may be integrated with vehicle 34 and may be used for purposes other than communicating information related to charging rechargeable battery 16. For example, user interface 28 may also be used to control an entertainment system of vehicle 34 or a navigation system of vehicle 34.

As discussed above with respect to FIG. 1, controller 20 is configured to control an adjustment of an amount of electrical energy from electrical power distribution system 10 that charger 18 uses to charge rechargeable battery 16 at different moments in time using price information for the electrical energy. Controller 20 may access the price information for electrical energy, for example, via price information source 22.

In some embodiments, controller 20 may automatically access the price information without user intervention and may control an adjustment of an amount of electrical energy that charger 18 uses to charge rechargeable battery 16 automatically and without user intervention.

In one embodiment, controller 20 uses the price information to reduce a cost of charging rechargeable battery 16 compared with arrangements which do not perform the controlling of the adjustment using the price information. For example, controller 20 may reduce a cost of charging rechargeable battery 16 as compared to a battery charging apparatus that is not aware of the price information by enabling charger 18 to charge rechargeable battery 16 during portions of a period of time when the price of the electrical energy is lowest and reducing charging or not charging vehicle 34 when costs of electrical energy are higher.

Controller 20 may control charger 18 to charge rechargeable battery 16 using different amounts of electrical energy at different moments in time using the price information. For example, at one moment in time (e.g., at a time when the price of the electrical energy increases), controller 20 may cease the charging. Furthermore, controller 20 may control charger 18 to charge rechargeable battery 16 using an increased amount of electrical energy at a first of the different moments in time compared with a second of the different moments in time as a result of the price of the electrical energy being less at the first of the different moments in time compared with the second of the different moments in time. For example, controller 20 may configure charger 18 to charge at 50% of a maximum rate at one moment in time when the electrical energy is available at a first price and later configure charger 18 to charge at 90% of a maximum rate at a second moment in time when the electrical energy is available at price lower than the first price. In another example, the charger may cease charging altogether when the price of electrical energy is elevated and may charge using a maximum amount of electrical energy when the price of electrical energy is lower.

As discussed above, the price information may include different prices of the electrical energy at the different moments in time. For example, the price information may indicate hourly prices, at least some of which are different relative to one another, over a twenty-four hour period. Controller 20 may increase and/or decrease the amount of the electrical energy used to charge rechargeable battery 16 at the different moments in time as a result of the different prices. The price information may include one or more projected prices over a future period of time and controller 20 may control charger 20 based on the one or more projected prices at respective moments of the future period of time. In some configurations, controller 20 may receive the price information from electrical power distribution system 10.

In some cases, controller 20 may receive an update changing one of the one or more projected prices and may adjust the amount of the electrical energy as a result of the receiving of the update. The update to the projected price may result from a change in electrical power distribution system 10. For example, if an amount of power available from electrical power distribution system 10 suddenly changes (e.g., because a power generation source is disabled or a major transmission line is disabled or because an on-site generator has been activated), the projected price may change accordingly (e.g., the price may drastically increase because supply is low and demand is high). In one embodiment, if a price update changes the previously projected price, the controller may alter the charging (e.g., reduce or cease charging if cost increases or increase charging if cost decreases).

In one embodiment, controller 20 may access information describing a desired future point in time for rechargeable battery 16 to be charged to a desired state. For example, controller 20 may access the information via user interface 28. Controller 20 may control charger 18 so that rechargeable battery 16 reaches the desired state by the desired future point in time. Furthermore, controller 20 may determine an anticipated amount of time to charge rechargeable battery 16 based on a current state of charge of rechargeable battery 16 and may control charger 18 as a result of the determining of the anticipated amount of time.

In some arrangements, controller 20 may control climate system 36. Doing so may include controller 20 estimating an amount of time to be consumed by climate system 36 to bring a temperature of electrical vehicle 34 to a desired temperature. In one embodiment, controller 20 may control an amount of the electrical energy consumed by charger 18 at the different moments in time based on the estimated amount of time to be consumed by climate system 36 to avoid climate system 36 being enabled simultaneously with charger 18.

Referring to FIG. 4, a method of charging a rechargeable battery is illustrated according to one embodiment. Although FIG. 4 depicts actions of the method arranged in a particular way, other embodiments of the method are possible including embodiments including additional or fewer actions than illustrated in FIG. 4 and/or actions performed in a different order than illustrated in FIG. 4. Below, the method of FIG. 4 is described as being implemented by controller 20. However, other embodiments are possible in which other circuitry apart from controller 20 may perform the method. Furthermore, FIG. 4 is described with respect to a vehicle application. The method may alternatively be applied to other applications which include rechargeable battery 16 other than vehicle applications.

At an act A10, controller 20 accesses price information, for example, by receiving the price information from price information source 22. In one embodiment, the price information may include prices of electrical energy from electrical power distribution system 10 for a future period of time (e.g., for the next twenty-four hours). The period of time may be broken down into intervals (e.g., one-hour intervals) and the price information may include a price for each of the intervals. In addition, the price information may include instantaneous updates in one embodiment. Some or all of the prices may be different from one another.

At an act A12, controller 20 accesses other information associated with charging rechargeable battery 16. The other information may include a current state of charge of rechargeable battery 16 (e.g., 20% charged), which controller 20 may retrieve from charger 18 in one embodiment. Controller 20 may also access information describing a desired state of charge (e.g., 100% charged), which may be provided by a user (e.g., via user interface 28). Controller 20 may also access information describing a future time by which rechargeable battery 16 should be charged to the desired state of charge. This information may be provided by a user, and in one configuration controller 20 may access this information via user interface 28 or storage circuitry 24.

In one embodiment, controller 20 may access information describing an energy storage capacity of rechargeable battery 16 (e.g., 14 kWh) and information describing an amount of power that electrical power distribution system 10 may deliver to battery charging apparatus 14 (e.g., 1 kW). In some cases, the amount of power may be related to the amperage rating of a circuit breaker through which the electrical energy flows. For example, if electrical power distribution system 10 delivers electrical energy at 120 V through a 15 A circuit breaker, the amount of power may be 1.4 kW.

At an act A14, controller 20 may determine whether vehicle 34 should be pre-heated or pre-cooled. In one embodiment, a user may indicate (e.g., via user interface 28) that the vehicle should be brought to a desired temperature by a future time. Alternatively or additionally, controller 20 may determine whether rechargeable battery 16 should be pre-heated or pre-cooled prior to or while charger 18 charges rechargeable battery 16.

At an act A16, if vehicle 34 is to be pre-heated or pre-cooled, controller 20 accesses temperature information describing the desired temperature of the cabin and/or a desired temperature of rechargeable battery 16. In one embodiment, controller 20 may also access information describing one or more current temperatures of vehicle 34, for example, from an onboard temperature sensing device.

At an act A18, controller 20 may use the desired temperature and the current temperature to estimate an amount of time that it will take for climate system 36 to bring the temperature of vehicle 34 to the desired temperature.

At an act A20, controller 20 may determine whether a user desires to charge rechargeable battery 16 immediately. If so, controller 20 might not use the price information in controlling charger 18. Instead, controller 20 may simply enable charger 18.

At an act A22, controller 20 may use some or all of: the price information accessed in act A10, the other information accessed in A12, and the estimated time determined in act A18 to optimize a cost of charging rechargeable battery 16. Optimizing the cost may include reducing the cost of charging as compared with a method of charging in which the price information is not considered. Optimizing the cost may also include minimizing the cost so that the cost is the lowest possible cost of charging rechargeable battery 16 that can be achieved within the future period of time associated with the price information (e.g., the next twenty-four hours) and to meet the user's expectations. Controller 20 may optimize the cost by controlling charger 18 to charge rechargeable battery 16 during the intervals of the future period of time associated with the price information having the lowest prices relative to other intervals of the future period of time.

In one embodiment described below, controller 20 may use a constraint equation and a method of minimizing a linear problem to optimize the cost. Other formulas and techniques of optimizing a cost may alternatively be used.

At an act A24, as a result of the optimizing of the cost, controller 20 may determine a schedule specifying when and how much electrical energy charger 18 should use to charge rechargeable battery 16. In one embodiment, the schedule may specify a subset of the intervals of the future period associated with the price information during which charger 18 should charge rechargeable battery 16 in order to optimize cost. For example, if the future period consists of price information for twenty-four intervals, controller 20 may determine that charger 18 will need six of the intervals to charge rechargeable battery 16 to the desired state of charge and that charger 18 needs to complete the charge by the nineteenth interval. Controller 20 may then determine (e.g., using the method described below) which six of the eighteen intervals occurring prior to the start of the nineteenth interval should be used to charge rechargeable battery 16. Controller 20 may use the price information to make this determination in one embodiment.

The schedule may also specify the amount of electrical energy charger 18 uses to charge rechargeable battery 16. For example, controller 20 may determine that charger 18 should use one amount of electrical energy during some of the intervals and a lower amount of electrical energy during others of the intervals.

For example, someone may connect electrical vehicle 34 to electrical power distribution system 10 (e.g., via battery charging apparatus 14) at 6:00 PM after returning home from work and may specify (e.g., via user interface 28) that electrical vehicle 34 (i.e., rechargeable battery 16) is to be recharged to full capacity by 6:30 AM (i.e., a desired future point in time). Controller 20 may communicate with charger 18 to determine a current state of charge of rechargeable battery 16. Using the current state of charge, a capacity of rechargeable battery 16, and a rate at which battery charging apparatus 14 can receive electrical energy from electrical power distribution system 10 (e.g., 1.4 kW for a 120 Volt/15 Amp line) controller 20 may determine that charging rechargeable battery 16 will be cheapest between 10:00 PM and 4:00 a.m.

In one embodiment, controller 20 may use the time estimate determined in act A18 in developing the schedule. In some configurations, the aggregate power drawn by the combination of charger 18 and climate system 36 may exceed a rate at which electrical power distribution system 10 may deliver electrical energy to battery charging apparatus 14 and climate system 36, potentially tripping a circuit breaker. Accordingly, in some embodiments, controller 20 may determine the charging schedule so that charger 18 and climate system 36 are not simultaneously enabled. In one embodiment, controller 20 may develop the schedule so that climate system 36 brings a temperature of vehicle 34 to a desired temperature just before a future time specified by the user, anticipating that the user may use vehicle 34 at the future time. Accordingly, the schedule may indicate that charger 18 completes charging prior to a time when climate system 36 is enabled.

In one embodiment, controller 20 may determine the charging schedule so that charger 18 charges at a reduced amount of electrical energy so that the aggregate power drawn by charger 18 and climate system 36 does not exceed the rate at which electrical power distribution system 10 may deliver electrical energy to battery charging apparatus 14 and climate system 36. In this embodiment, charger 18 and climate system 36 may both be operational simultaneously.

If controller 20 previously determined at act A20 that charger 18 should immediately begin charging rechargeable battery 16, the schedule determined at act A24 may simply indicate that charger 18 should start charging immediately.

At an act A26, controller 20 may control charger 18 according to the schedule determined by controller 20. Controlling charger 18 may include enabling charger 18, disabling charger 18, and/or adjusting an amount of electrical energy which charger 18 uses to charge rechargeable battery 16 when charger 18 is enabled. If the schedule includes enabling climate system 36, act A26 may also include controller 20 controlling climate system 36.

In some configurations, controller 20 may receive updates to previously received price information during the period associated with previously received price information. These updates may replace the previously received price information. For example, an update may indicate a new price or prices for three of the intervals of the period. An operator of electrical power distribution system 10 may use the updates to quickly increase a price due to an event affecting the operator's ability to supply electrical energy. For example, if a major transmission line is disabled, the operator may quickly and substantially raise the price for intervals of the period as a way of discouraging consumption of electrical energy during a time when the operator's ability to supply the electrical energy is hampered by the disabled transmission line.

If controller 20 receives a price update, controller 20 may repeat one or more of the acts of FIG. 4 in response to receiving the price update. For example, controller may access the updated price at act A10, may repeat the optimization of the charging cost at act A22, may revise the charging schedule at act A24, and may execute the revised charging schedule at act A26.

One embodiment of a method of minimizing a cost of charging is described below. Other formulas and techniques for optimizing a cost may alternatively be used in other embodiments.

One embodiment of a method using a constraint equation and a method of minimizing a linear problem to optimize charging cost is described below. Controller 20 may use this method to optimize a charging cost. Other methods and/or techniques for optimizing a charging cost may alternatively be used by controller 20 in other embodiments.

Optimizing the cost of charging rechargeable battery 16 may be formulated as the following linear programming problem:

minimize $$Z = c_i p_i \quad (2.4a) \qquad \text{(Equation 1)}$$

subject to the constraint:

$$A_{n,m} p_n \leq b_n \quad (2.4a) \qquad \text{(Equation 2)}$$

The objective function can be written as:

$$Z = \sum_{i=1}^{24} c_i p_i \Delta t \qquad \text{(Equation 3)}$$

where Z is the cost of electricity consumed over a 24-hour period, $c_i$ is the cost of electricity in hour i in $/kWh, $p_i$ is the average power delivered to charger 18 in hour i in kW, and $\Delta t$ is one hour.

Regarding the constraint equation, $b_m$ is a the maximum power that can be drawn from a connection to electrical power distribution system 10 (e.g., 1.4 kW for a 120 Volt/15 Amp connection), $A_{n,m}$ is diagonal matrix of 1's, and $p_n$ is the average power delivered to charger 18 in hour n in kW.

In some cases, there may be only one constraint equation that constrains rechargeable battery 16 to reach a desired state of charge (SOC) (e.g., 50% charged, 75% charged, 100% charged, etc.) at a user-specified time. The constraint matrix becomes a (1,24) matrix. The constraint equation may be written as follows:

$$SOC_{initial} + \frac{1}{cap_{bat}} \sum_{i=1}^{n} p_i \Delta t = SOC_{end} \quad \text{(Equation 4)}$$

or rearranged:

$$\sum_{i=1}^{n} p_i \Delta t = (SOC_{end} - SOC_{initial}) \cdot cap_{bat} \quad \text{(Equation 5)}$$

where $cap_{bat}$ is the capacity of rechargeable battery 16, $SOC_{initial}$ is the initial state of charge of rechargeable battery 16 (e.g., 10%), and $SOC_{end}$ is the desired SOC (e.g., 100%).

There are the following bounds on the decision variable $$0 \leq p_i \leq p_{max} \quad \text{(Equation 6)}$$

where $p_{max}$ is the maximum charging power that can be drawn from a connection to electrical power distribution system 10 (e.g., 1.4 kW for a 120V/15 A supply) and $cap_{bat}$ is the rated energy capacity of rechargeable battery 16 in kWh.

From a computational point of view, it may be practical to non-dimensionalize the optimization problem. The following non-dimensional variables may be defined:

$$p^* = \frac{p}{p_{max}} \quad \text{(Equation 7)}$$

$$c^* = \frac{c}{c_{max}} \quad \text{(Equation 8)}$$

$$\Delta t^* = \frac{\Delta t}{\Delta t_0} \quad \text{(Equation 9)}$$

Accordingly, the non-dimensional objective function can be re-written as:

$$Z^* = \frac{X}{c_{max} p_{max} \Delta t_0} = \sum_{i=1}^{24} a_i p_i^* \quad \text{(Equation 10)}$$

with the non-dimensionlized cost coefficient $$a_i = \Delta t^* c_i^* \quad \text{(Equation 11)}$$

and the non-dimensionalized constraint equation may be rewritten as:

$$\sum_{i=1}^{n} p_i^* = (SOC_{end} - SOC_{initial}) \cdot \frac{cap_{bat}}{p_{max} \Delta t^* \Delta t_0} \quad \text{(Equation 12)}$$

with the bounds on the non-dimensional variables $$0 \leq p_i^* \leq 1 \quad \text{(Equation 13)}$$

Many different techniques may be used to solve the linear optimization problem including the technique described in Chapter 10 of the book "Numerical Recipes, The Art of Scientific Computing," Cambridge University Press, 1988, which is incorporated herein by reference.

According to this technique, the following arrays and variables are assigned:

M : number of constraint equations. Here M=1;
N : number of decision variables: Here assume first 24 decision variables to represent the 24 hourly problem space. The time variable may be reduced, of course, for example to 15 minutes rather than an hour. In this example, N=24.
NP=N+1;
MP=M+2;
A : the constraint matrix. It also contains the objective function. The size of the constraint matrix is (M+2, N+1);
A(1,n+1 . . . NP)=coefficient of objective function
A(2,n+1 . . . NP)=constraint coefficient. This may be the resting time (the time that rechargeable battery 16 is connected to electrical power distribution system 10 and is available for charging).

In one example, the following non-dimensionalized variables may be used:

TABLE A

| Non-dimensionalized variables | | | |
|---|---|---|---|
| Non-dimensionalize define | $C^* = C/Cmax$ | | |
| | $dt^* = dt/dt0$ | | |
| | Cmax = $1 | 1 | $ |
| | dt0 = 1 hour | 1 | hour |
| | dt | 1 | hour |
| | dt* | 1 | |
| | Pmax | 1.4 | kW |
| | Cap | 14 | kWh |

Then, the following power rates and resting time of the vehicle may be used. The values in the time column represent intervals of a time period. Resting time is time during which rechargeable battery 16 may be charged. In Table B, a "1" indicates that rechargeable battery 16 may be charged during the interval and a "0" indicates that rechargeable battery 16 may not be charged during the interval. In one embodiment, intervals 7:00 through 12:00 may be outside of the resting time because a user may have specified 7:00 as a desired time of charge completion. Accordingly, controller 20 may determine a schedule so that charging does not take place during the intervals from 7:00 through 12:00.

TABLE B

Rates and TOU rate and resting time.

| Time | Electric Rates [$/kWh] | Non-dimensionalized rate (C*) | Resting time |
|---|---|---|---|
| 13:00 | 0.0772 | 0.0772 | 0 |
| 14:00 | 0.0772 | 0.0772 | 0 |
| 15:00 | 0.0772 | 0.0772 | 0 |
| 16:00 | 0.0772 | 0.0772 | 1 |
| 17:00 | 0.0772 | 0.0772 | 1 |
| 18:00 | 0.0772 | 0.0772 | 1 |
| 19:00 | 0.0452 | 0.0452 | 1 |
| 20:00 | 0.0452 | 0.0452 | 1 |
| 21:00 | 0.0452 | 0.0452 | 1 |
| 22:00 | 0.0452 | 0.0452 | 1 |

TABLE B-continued

Rates and TOU rate and resting time.

| Time | Electric Rates [$/kWh] | Non-dimensionalized rate (C*) | Resting time |
|---|---|---|---|
| 23:00 | 0.0358 | 0.0358 | 1 |
| 0:00 | 0.0358 | 0.0358 | 1 |
| 1:00 | 0.0358 | 0.0358 | 1 |
| 2:00 | 0.0358 | 0.0358 | 1 |
| 3:00 | 0.0358 | 0.0358 | 1 |
| 4:00 | 0.0358 | 0.0358 | 1 |
| 5:00 | 0.0358 | 0.0358 | 1 |
| 6:00 | 0.0358 | 0.0358 | 1 |
| 7:00 | 0.0452 | 0.0452 | 0 |
| 8:00 | 0.0452 | 0.0452 | 0 |
| 9:00 | 0.0452 | 0.0452 | 0 |
| 10:00 | 0.0452 | 0.0452 | 0 |
| 11:00 | 0.0452 | 0.0452 | 0 |
| 12:00 | 0.0772 | 0.0772 | 0 |

So that:

A(1, . . . )=(0, 0.0772, 0.0772, 0.0772, 0.0772, 0.0772, 0.0772, 0.0452, . . . 0.0772);

A(2, . . . )=(10, 0,0,0,1,1,1,1,1,1,1,1,1,1,1,1,1,1,1,0,0,0,0,0, 0); and cap/pmax/dt*/dt0=14 kWh/1.4 kW/1 h/1=10.

Referring to FIG. 5A, results of the optimization example described above in relation to Tables A and B are illustrated. FIG. 5A illustrates price information associated with electrical energy provided by electrical power distribution system 10. Note that the prices are lower during nighttime hours.

Referring to FIG. 5B, a resting time associated with the example described above in relation to Tables A and B is illustrated. Note that according to the resting time, rechargeable battery 16 is available for charging between the hours of 15:00 and 7:00.

Figure 5C:
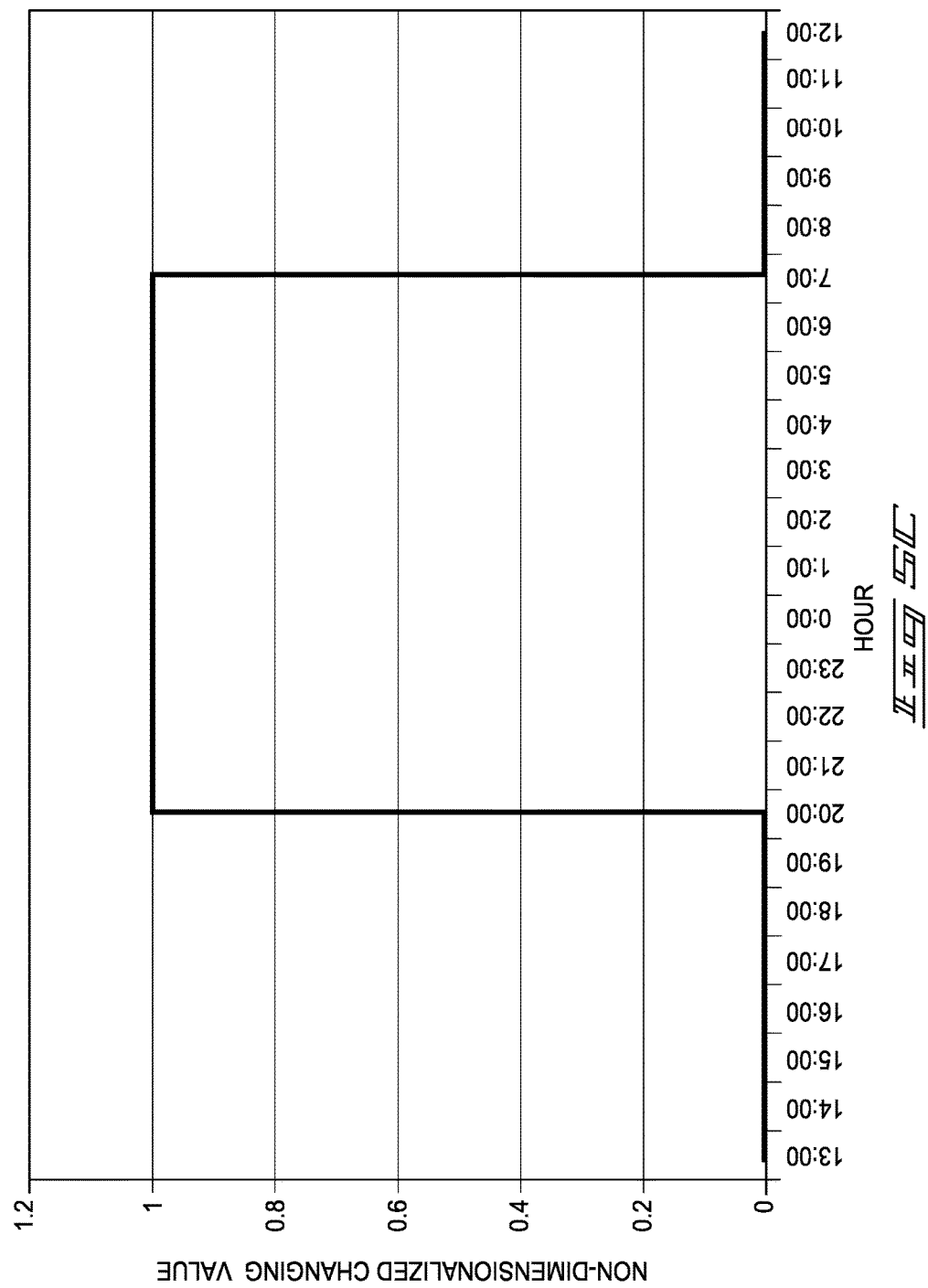
FIG. 5C is a graph illustrating schedule information according to one embodiment.
Figure 6H:
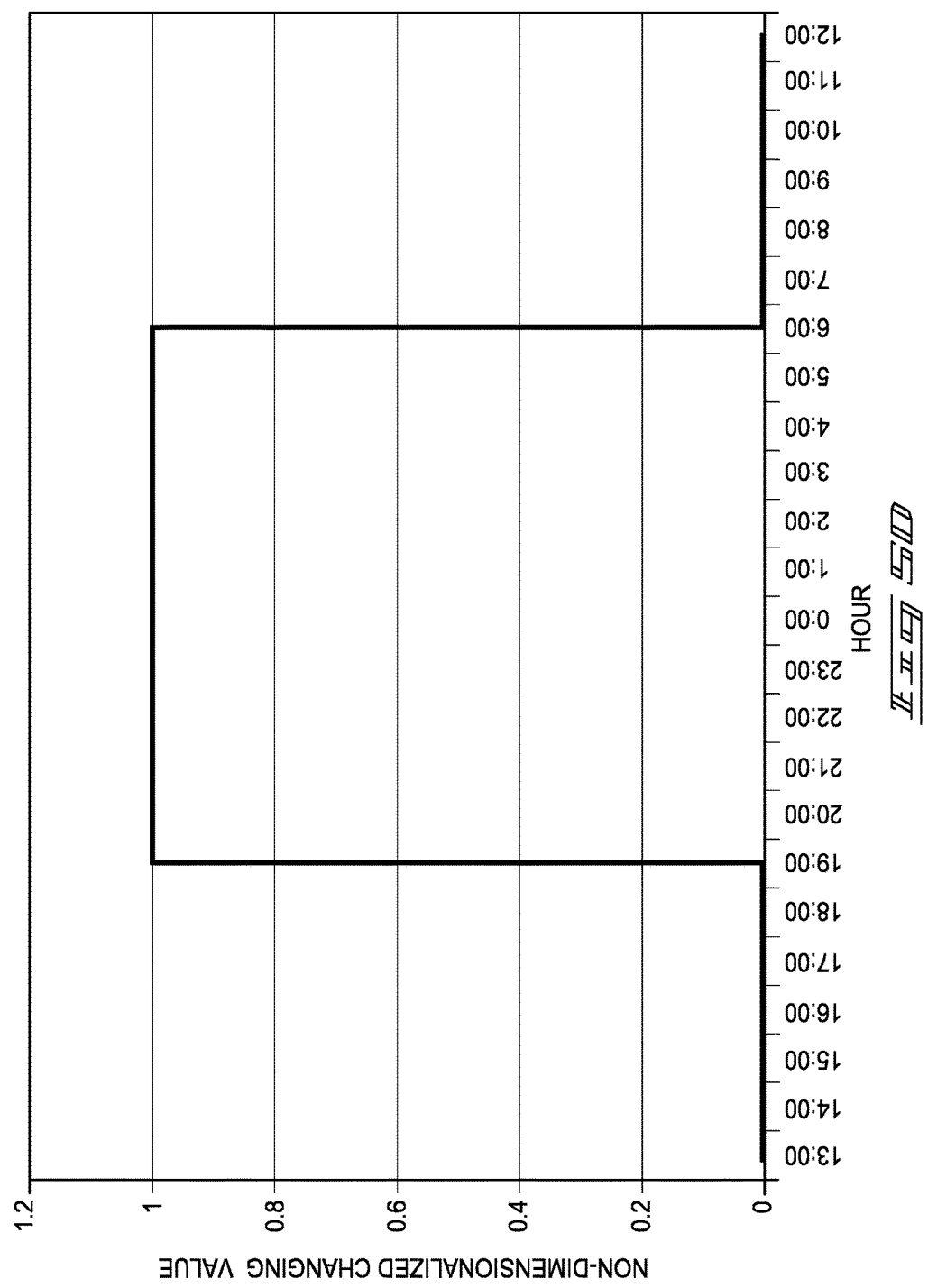

Referring to FIG. 5C, a charging schedule associated with the example described above in relation to Tables A and B is illustrated. Note that the schedule indicates that the most cost effective time to charge rechargeable battery 16 is between 20:00 and 7:00.

Referring to FIG. 5D, a modified version of the charging schedule of FIG. 5C is illustrated. The charging schedule of FIG. 5C has been modified to allow time for climate system 36 to bring vehicle 34 to a desired temperature prior to 7:00. According to the modified charging schedule, the most cost effective time to charge rechargeable battery 16 in view of the need to bring vehicle 34 to the desired temperature is between 19:00 and 6:00.

Referring to FIG. 5E, a schedule associated with climate system 36 is illustrated. According to the schedule, controller 20 should enable climate system 36 starting at 6:00 and disable climate system 36 at 7:00 to bring vehicle 34 to the desired temperature by 7:00.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. An electrical vehicle comprising:
a rechargeable battery;
a charger configured to receive electrical energy from an electrical power distribution system and to apply the electrical energy from the electrical power distribution system to the rechargeable battery to charge the rechargeable battery;
a climate system configured to alter a temperature inside a cabin of the vehicle; and
a controller configured to:
estimate an amount of time to be consumed by the climate system to bring the cabin temperature to a desired temperature;
access price information of the electrical energy supplied by the electrical power distribution system; and
control an amount of the electrical energy from the electrical power distribution system which is applied by the charger to the rechargeable battery at different moments in time using the price information and the estimate.

2. The vehicle of claim 1 wherein the controller is configured to control the charger to charge the rechargeable battery using different amounts of electrical energy at the different moments in time using the price information.

3. The vehicle of claim 2 wherein the controller is configured to control the charger to charge using an amount of electrical energy at a first of the different moments in time compared with a second of the different moments in time as a result of the price of the electrical energy being less at the first of the different moments in time compared with the second of the different moments in time.

4. The vehicle of claim 1 wherein the controller is configured to control the charger to charge the rechargeable battery using different amounts of electrical energy at the different moments in time using the price information.

5. The vehicle of claim 4 wherein the controller is configured to access information describing a desired future point in time for the rechargeable battery to be charged to a desired state and to control the charger so that the rechargeable battery reaches the desired state by the desired future point in time.

6. The vehicle of claim 1 wherein the controller is configured to access information describing a desired future point in time for the rechargeable battery to be charged to a desired state and to control the charger so that the rechargeable battery reaches the desired state by the desired future point in time.

7. The vehicle of claim 1 wherein the controller is configured to:
identify a first future point in time for the electrical vehicle to be ready for use;
determine a different second future point in time for the rechargeable battery to be charged to a desired state of charge based on the estimate, the second point occurring before the first point;
control the charger such that the rechargeable battery is charged to the desired state of charge before or at the second point in time; and
control the climate system to bring the cabin temperature to the desired temperature during a period after the second point in time and before the first point in time.

* * * * *

UNITED STATES PATENT AND TRADEMARK OFFICE
CERTIFICATE OF CORRECTION

Page 1 of 1

PATENT NO. : 10,442,302 B2
APPLICATION NO. : 15/163925
DATED : October 15, 2019
INVENTOR(S) : Michael Kintner-Meyer It is certified that error appears in the above-identified patent and that said Letters Patent is hereby corrected as shown below:

In the Specification

Column 13, Line 53:
Replace:

$$Z^* = \frac{X}{c_{max}\, p_{max}\, \Delta t_0} = \sum_{i=1}^{24} a_i\, p_i^*$$

With:

$$Z^* = \frac{Z}{c_{max}\, p_{max}\, \Delta t_0} = \sum_{i=1}^{24} a_i\, p_i^*$$

Signed and Sealed this
Seventeenth Day of March, 2020

Andrei Iancu
*Director of the United States Patent and Trademark Office*